United States Patent Office.

OLAF BORCH AND LAURITZ PETERSEN HVIID, OF COPENHAGEN, DENMARK.

PROCESS OF TREATING CALCIUM CARBID.

SPECIFICATION forming part of Letters Patent No. 670,607, dated March 26, 1901.

Application filed June 23, 1900. Serial No. 21,343. (No specimens.)

*To all whom it may concern:*

Be it known that we, OLAF BORCH, manufacturer and cand. pharm., of 18 Norregarde, and LAURITZ PETERSEN HVIID, manufacturer and cand. pharm., of 115 Vesterbrogade, Copenhagen, in the Kingdom of Denmark, have invented a new and useful Process of Treating Calcium Carbid; and we do hereby declare the nature of this invention and in what manner the same is to be performed to be particularly described and ascertained in and by the following statement.

This invention relates to a process for producing a mixture of carbid of calcium for illuminating purposes.

The employment in lamps and small apparatus of carbid of calcium on the drop or immersion system has hitherto been attended with the great disadvantage that the lime sludge quickly assumes the form of a hard stone-like substance. This is attributed to a too-great generation of heat with a small supply of water. In consequence of the settling of the hard lime mass the cleaning of the lamps and of the apparatus is rendered more troublesome. Moreover, some time is occupied in relighting a lamp, as the hard layer of lime which covers the undissolved carbid only allows the water to penetrate slowly.

In the specification of German Patent No. 94,639 a process is described whereby some of the above-mentioned inconveniences are obviated by covering the carbid with sugar or with substances containing sugar. This protective coating is intended, on the one hand, to prevent the carbid from absorbing moisture, and, on the other hand, to render the lime produced soluble. The carbid thus prepared certainly acts at the outset in accordance with the the patent; but it very quickly loses its effectiveness directly the coating of sugar has been dissolved and used up. The carbid is then acted upon by a solution of saccharates of lime, whence insoluble multiple basic saccharates are produced, as the lime sludge is in excess relatively to the quantity of liquid acting on it. Hence the opposite effect is produced to that desired. (See *Organische Chemie Dr. V. von Richter*, 6th edition, 1891, pages 546-47.) The inner layers then become covered, as hitherto, with a hard sludge or layer of lime and insoluble saccharates of lime, and thereby, on the one hand, promote the after-make of gas, and, on the other hand, prevent the water from reaching the carbid which is still undissolved. This difficulty is obviated entirely by the present invention.

For the production of the carbid preparation a strongly-hygroscopic substance is employed—namely, chlorid of calcium—the carbid not being coated therewith; but the said substance is well ground with the carbid in mills which are closed so as to be air-tight, so that a powder is obtained which consists of chlorid of calcium and carbid thoroughly intermixed. This mixture is either packed in boxes or pressed into blocks (briquets) and wrapped in tin-foil or provided in some other manner with a protective covering. If the preparation thus produced be employed for generating acetylene gas, the resulting lime sludge forms, on the one hand, a soft substance, and, on the other, has the important advantage that when the supply of water is discontinued the after-make of gas quickly ceases, as the water contained in the chlorid-of-calcium lime sludge is retained by the strongly-hygroscopic chlorid of calcium. Moreover, the undissolved carbid of calcium is coated with the moist chlorid-of-calcium lime sludge, and when water is supplied afresh it quickly and easily conducts the latter to the carbid, so that the lamp can be quickly relighted. The formation of a hard residue, which acts so objectionably when pure carbid of calcium is employed, as well as when an addition of sugar is used, does not occur in the present case. It is desirable that about ten per cent. of chlorid of calcium be added to the carbid of calcium.

The carbid of calcium can of course be replaced by a substance having a similar effect—as, for example, chlorid of zinc, magnesium, or the like.

Having now particularly described and ascertained the nature of our said invention and in what manner the same is to be performed, we declare that what we claim is—

1. The herein-described process for treating calcium carbid, which consists in grinding a suitable hygroscopic material therewith in an air-tight mill.

2. The herein-described process for treating calcium carbid, which consists in grinding a suitable hygroscopic material therewith in an air-tight mill and then briqueting the same.

3. The herein-described process for treating calcium carbid, which consists in grinding a suitable hygroscopic material therewith in an air-tight mill, then briqueting the same, and then providing the briquets with a protective covering.

4. The herein-described process for treating calcium carbid, which consists in grinding ten per cent. of a suitable hygroscopic material therewith in an air-tight mill.

5. The herein-described process of treating calcium carbid, which consists in grinding chlorid of calcium therewith in an air-tight mill and then briqueting the same.

6. The herein-described process of treating calcium carbid, which consists in grinding chlorid of calcium therewith in an air-tight mill, then briqueting the same, and then providing briquets with a protective covering.

7. The herein-described process of treating calcium carbid, which consists in grinding therewith ten per cent. of chlorid of calcium in an air-tight mill.

8. As a new article of manufacture, a briquet consisting of calcium carbid and chlorid of calcium.

9. As a new article of manufacture, a briquet consisting of calcium carbid and a suitable hygroscopic material.

In witness whereof we have hereunto set our hands in presence of two witnesses.

OLAF BORCH.
LAURITZ PETERSEN HVID.

Witnesses:
J. C. JACOBSEN,
J. C. INGERSOLL.